United States Patent [19]
Sweeney

[11] Patent Number: 5,292,410  
[45] Date of Patent: * Mar. 8, 1994

[54] METHOD FOR CONVERSION OF CELLULOSIC AGRICULTURAL WASTES IMPROVING DIGESTIBILITY OF GRAINS FOR LIVESTOCK FEED

[76] Inventor: Charles T. Sweeney, 4421 88th St., Lubbock, Tex. 79427

[*] Notice: The portion of the term of this patent subsequent to Jul. 16, 2008 has been disclaimed.

[21] Appl. No.: 909,726

[22] Filed: Jul. 7, 1992

Related U.S. Application Data

[63] Continuation-in-part of Ser. No. 885,431, May 18, 1992, which is a continuation-in-part of Ser. No. 593,028, Oct. 5, 1990, Pat. No. 5,118,397, and a continuation-in-part of Ser. No. 808,223, Dec. 16, 1991.

[51] Int. Cl.$^5$ .............................................. A23K 1/00  
[52] U.S. Cl. ......................... 204/131; 426/539; 426/615; 426/635; 426/636; 426/807  
[58] Field of Search ............... 426/539, 635, 636, 615, 426/807; 204/131

[56] References Cited

U.S. PATENT DOCUMENTS

| | | | |
|---|---|---|---|
| 4,049,490 | 9/1977 | Zaplatin et al. | 162/37 |
| 4,307,121 | 12/1981 | Thompson | 426/431 |
| 4,965,086 | 10/1990 | Helmling et al. | 426/636 |
| 5,118,397 | 6/1992 | Sweeney | 204/131 |

FOREIGN PATENT DOCUMENTS

| | | | |
|---|---|---|---|
| 207496 | 3/1984 | Fed. Rep. of Germany | 426/636 |
| 56-151481 | 11/1981 | Japan | 426/539 |

Primary Examiner—T. Tung  
Assistant Examiner—Arun S. Phasge  
Attorney, Agent, or Firm—Neal J. Mosely

[57] ABSTRACT

A method for improving the digestibility or crop residues and feed grains for livestock is disclosed in which such crop residues and grains are treated with an aqueous solution of chlorites at a pH at or above 9, except for sorghum grain which is buffered so that the solution has a pH between 6.5 and 7.0. The treated grains are satisfactory feed for ruminant animals, improved by about 50% in digestibility and are non-toxic.

15 Claims, 1 Drawing Sheet

CHLORITE OCL PRODUCTION

METHOD FOR CONVERSION OF CELLULOSIC AGRICULTURAL WASTES IMPROVING DIGESTIBILITY OF GRAINS FOR LIVESTOCK FEED

CROSS REFERENCE TO RELATED APPLICATION

This application is a continuation-in-part of co-pending application Ser. No. 885,431 filed May 18, 1992, which is a continuation-in-part of U.S. Pat. No. 5,118,397 issued Jun. 1, 1992, from Ser. No. 593,028, filed Oct. 5, 1990. This application is also a continuation-in-part of co-pending application Ser. No. 808,223 filed Dec. 16, 1991.

FIELD OF THE INVENTION

This invention relates to new and useful improvements in methods for conversion of cellulosic agricultural wastes into a form which is more edible and digestible by ruminant animals and to new and useful improvements in methods for improving the digestibility of grains for livestock feed.

BRIEF DESCRIPTION OF THE ART

Crop residues, i.e., cellulosic wastes, such as cotton gin trash, straw, corn stalks and husks, cotton wastes, peanut shells, saw dust, etc., offer a tremendous food resource for ruminant animals, as well as more digestible forms for grains such as corn and sorghum. For each pound of corn, wheat, milo, etc., produced, there is left a cellulosic residue of about one pound. A small amount of these residues are used as animal feed, e.g., by grazing of fields after harvesting the grain. Further, grains while substantially digestible, as discussed below, takes time to digest and may have potential for both increased time and efficiency to digest.

Cellulosic wastes, such as cotton gin trash, straw, corn stalks and husks, cotton wastes, peanut shells, saw dust, etc., are highly lignified cellulose structures which are digested poorly, if at all, by ruminants. For example, cotton gin trash is only digested about 36%-44% and wheat straw is only digested about 35-40% by ruminants as compared to 55-60% for conventional forage such as alfalfa and 80-90% for grains.

Recently, work at the University of Illinois, University of Nebraska and Texas Tech University has shown that cellulosic wastes can be broken down by treatment with alkaline hydrogen peroxide to produce a cellulosic residue which is 55-75% digestible. The problem in utilization of this treatment has been one of logistics as well as the additional expense of the hydrogen peroxide and/or sodium hydroxide and/or other chemicals in the quantities required.

Cellulosic wastes are readily available on the farm, or at cotton gins in the case of gin trash, but these materials are bulky and expensive to transport. It is therefore uneconomical to move the dispersed cellulosic wastes to chemical processing facilities. The only practical way, at present, to treat these wastes would involve treatment and consumption of the treated materials on the farm. However, central processing might be practical in the case of cotton gin trash, because of the large quantities collected at central locations.

The following references are relevant to the production of oxidizers and their use in chemically treating agricultural wastes. R. Norris Shreve, "Chemical Process Industries" 3rd Ed., McGraw-Hill, New York, N.Y. pp. 222-259, (1967); Kirk Othmer, "Encyclopedia of Chemical Technology" 3rd Ed. vol X5, 580-611, Interscience Publishers, New York, N.Y. (1968); Wendell Latvmer, "Oxidation Potentials" Prentice Hall, New York, N.Y. (1952); Michael Andon, "Oxygen" W. A. Benjamin, New York, N.Y. (1965); C. R. Wilke, et. al., "Enzymatic Hydrolysis of Cellulose, Theory and Application" pp. 41-61, Noyes Data Corporation Park Ridge, N.J. (1983); and David A. Tillman and Edwin C. John, "Progress in Biomass Conversion" Volume 4, Academic Press, New York, N.Y. (1983). With few exceptions, all prior work with chemical treatments regarding biomass roughages to break down lignin was directed at utilizing sodium hydroxide (NaOH) and hydrogen peroxide ($H_2O_2$) solutions.

F. J. Bas et al J. Dairy Sci. 72:1217-1227 "Influence of Protein Supplementation of Alkaline Hydrogen Peroxide-Treated Wheat Straw on Ruminal Microbial Fermentation" reports a dual flow continuous culture system was used to determine the effects of four protein sources (soybean meal, Ca-lignosulfonate treated soybean meal, blood meal, and feather meal), supplied individually or in 12 combination in diets composed predominantly of alkaline hydrogen peroxide-treated wheat straw, on ruminal microbial fermentation and amino acid flow.

Hemlin et al Biotechnology and Bioengineering Vol. 33, pp. 237-241 "Improving the Nutritive Value of Lignocellulosics: The Synergistic Effects between Alkaline Hydrogen Peroxide and Extrusion Treatments" reports that a major underutilized substrate for ruminant animal feed is the roughage and by-product feedstuffs which are high in structural carbohydrate concentration. A number of pretreatments such as alkaline cooking, steam explosion, and combined mechanical and chemical processing steps have been developed. For example, a treatment of wheat straw with 25-50% hydrogen peroxide (dry matter basis) at pH 11.2-11.8 and 2-4% stock consistency is discussed. Hydrogen peroxide improved digestibility only when it was activated by additional sodium hydroxide.

Flachowsky et al. Arch. Anim. Neutr., Berlin 38 (1988) 10, 953-964 "Effect of NaOH and $H_2O_2$, on the degradability of straw in ruminants" reports fibrous agricultural residues are characterized by a poor digestibility and a limited feed intake. Sodium hydroxide treatment caused a greater increase in dry matter degradability for barley straw (5.6 percentage units per 1% NaOH) than for turnip rape straw (3.6). Hydrogen peroxide did not significantly influence ($P>0.05$) the rumen dry matter degradability of barley and rape straw, but disappearance of hemicellulose of rape seed straw was increased (6.5, 14.1 and 18.9%). Compared with barley straw soaked in pure water (57.4%) straw soaked in solutions containing 0.71 and 1.50% NaOH showed an in vitro digestibility of 80.9 and 83.0% respectively. Hydrogen peroxide used alone (63.1%) or in combination with NaOH (74.4%) showed little or no effect on the in vitro digestibility of the straw.

Gould et al Biotechnology and Bioengineering Vol. 33, 233-236 "Treatment of Wheat Straw with Alkaline Hydrogen Peroxide in a Modified Extruder." reported that treatment of lignocellulosic agricultural by-products such as wheat straw and corn with alkaline hydrogen peroxide has been shown to greatly increase susceptibility of cell wall carbohydrates in these materials to digestion by cellulolytic microorganisms such as those in the ruminant gut. Feeding studies with sheep and cattle demonstrated that alkaline hydrogen peroxide treatment increased the digestibility of wheat straw to a level comparable to that observed for cereal grains. The amount of hydrogen peroxide required to achieve high in situ digestibilities was reduced ca. 10-fold by treating wheat straw in the modified extruder. Optimization of extruder design to better handle straw and similar materials should also increase alkaline peroxide treatment efficiency.

D. V. Reddy et al Biological Wastes, 28 (1988) 133-141, "Effect of Hydrogen peroxide Treatment on the Utilization of Lignocellulosic Residues by Rumen Micro-organisms" discloses treating oat straw, wheat straw and sugar-cane bagasse by incubation for 21 days with various combinations of hydrogen peroxide, ammonia and urea.

Gould et al U.S. Pat. No. 4,997,488 discloses a synergistic combination of high-shear mechanical disruption and alkali pretreatment in a high solids reaction mixture which constitutes a significant improvement in the alkaline peroxide treatment of lignocellulosic materials. The products are useful as carbohydrate sources in ruminant feeds, as microbial feedstocks, and as sources of dietary fiber.

Helmling U.S. Pat. No. 4,965,086 discloses a method for treating a lignocellulosic substrate in order to improve its nutritive value wherein a plant substrate is treated with a sufficient amount of an alkaline material and hydrogen peroxide, or a compound capable of generating hydrogen peroxide, for a sufficient period of time, and the reaction mass is extruded to produce a product having increased nutrient availability. It has been surprisingly found that the improvement in digestibility cannot be obtained by using extrusion alone or by using the alkaline hydrogen peroxide treatment alone.

Chou et al U.S. Pat. No. 4,957,599 discloses an improved process for delignifying and bleaching non-woody, lignocellulosic material into products digestible by ruminants and ingestible by humans comprising treating the substrate in an alkaline solution for a period of time, separating the wetted substance from the slurry and then treating the wetted substrate with an alkaline peroxide solution at an initial pH of 8.5 to 11.0 for a period of time, and separating, washing and drying the product.

Anthony U.S. Pat. No. 4,515,816 discloses lignocellulose-containing materials chemically converted to a form suitable for feeding to ruminant animals by wetting the materials with dilute acid, e.g., sulfuric acid, storing the wet material at ambient temperature and pressure in a low acid environment to effect mild hydrolysis of the materials, drying the acidified materials and partially neutralizing the dried material with ammonia.

Jayawant U.S. Pat. No. 4,859,283 discloses a process for delignifying and bleaching nonwoody, lignocellulosic material into products digestible by ruminants and ingestible by humans. The process comprises treating the substrate in an alkaline solution for a period of time and adding magnesium ions prior to adding peroxide or, alternatively, adding the magnesium to the peroxide prior to adding the peroxide to the alkaline slurry.

Gould U.S. Pat. No. 4,649,113 discloses treating agricultural crop residues and other nonwoody lignocellulosic plant substrates with $H_2O_2$ at a controlled pH within the range of about 11.2 to 11.8. The products of this treatment are nontoxic and are characterized by low crystallinity and near quantitative cellulase digestibility. They are useful as carbohydrate sources in ruminant feeds.

Reitter U.S. Pat. No. 4,427,453 discloses a process for the continuous hydrolysis into sugars of pentosan-containing hemicellulose, cellulose, and corresponding compounds of plant biomass. As a first step the appropriately pre-crushed biomass is treated in the presence of dilute acid at a specific temperature and pressure. Under these conditions mainly hemicellulose but partially cellulose, are hydrolyzed into pentoses and hexoses during the initial reaction. The reaction pressure is suddenly released and the hydrolysate is ejected from the biomass.

Halliday U.S. Pat. No. 5,026,571 discloses the effect of different chemical treatments applied to barley straws, timothy and alfalfa hays. Treatments consisted of four concentrations of hydrogen peroxide (3%, 5%, 7% and 9%) in combination with 4% ethanolamine with or without the addition of sodium hydroxide, which was added to increase the pH. The ability of each treatment to improve the nutritive value of the forage and their effect on rumen function was ascertained.

Hydrogen peroxide, of course, has had considerable use in the bleaching and pretreatment of paper pulp.

Fritzvold et al U.S. Pat. No. 4,450,044 discloses peroxide bleaching of paper pulp.

Kurz U.S. Pat. No. 2,828,253 discloses a process of digesting fibrous plant material such as wood, straw and the like, and more particularly to a continuous process of digesting such fibrous plants by means of alkaline lye and chlorine derived from an electrolytic chlorine generating cell.

While not prior art, a considerable amount of work has also been done on improving the digestibility of both cellulosic agricultural wastes and feed grains by treatment with a mixed oxidant gas produced by a certain type of electrolytic cell.

Charles T. Sweeney, U.S. Pat. No. 5,032,239, and U.S. Pat. No. 5,118,397, and Ser. No. 808,223, filed Dec. 16, 1991 disclose the use of various mixed oxidant gases in the conversion of cellulosic wastes which offers the prospect of overcoming both the reagent cost and logistical problems encountered in the preparation of ruminant feeds. This research has involved the utilization of various mixed oxidant gases produced by various electrolytic cells.

However, chemical grain treatment for digestibility is substantially non-existent in practice. Chemicals utilized to increase moisture absorption have been used for years; however, increase in digestibility appears to have not been substantially explored. Instead, mechanical fracturing of the grain and "steaming" the grain is one method used to increase the digestibility throughout some areas of current day feeding programs.

In U.S. Pat. No. 5,032,239, Jul. 16, 1991, Sweeney established a "cost effective" method, utilizing electrolytic cells to commercialize "chemical treated roughages" due to the low cost of the process. Cotton waste products were treated and the digestibility increases of the treated gin waste exceeded 50% of the non-treated gin trash.

In U.S. Pat. No. 5,118,397, Jun. 2, 1992, Sweeney utilized "mixed oxidants" of chlorine and oxygen species to treat both roughages and grains. Various roughage products such as gin waste, wheat straw and peanut hay were all treated with results of increased digestibility over non-treated roughages. Increased digestibility for gin waste exceeded 50% vs. non-treated gin trash.

Sorghum grain after treatment increased 20% whereas corn after treatment increased 16%. The increase in digestibility of the grains is believed to be attributed in part to the conversion of cellulosic and proteinaceous fractions of the grains which are relatively indigestible.

With the two non prior art patents of Sweeney, an electrolytic cell has lowered the cost per ton to treat biomass materials for increased digestibility. In addition, grains have now been shown to respond to increases in digestibility when treated in the manner described in U.S. Pat. No. 5,118,397.

SUMMARY OF THE INVENTION

One object of this invention is to provide a new and improved method for the solution treatment of crop residues and feed grains to convert them to a form significantly more edible and digestible by ruminant animals.

Another object of this invention is to provide a new and improved method for the solution treatment of crop residues and feed grains to convert them to a form significantly more edible and digestible by ruminant animals utilizing a solution of chlorites (OCl) at an elevated pH.

Another object of this invention is to provide a new and improved method for the solution treatment of crop residues and feed grains to convert them to a form significantly more edible and digestible by ruminant animals utilizing a solution of chlorites (OCl) with sodium hydroxide Another object of this invention is to provide a new and improved method for the solution treatment of crop residues and feed grains to convert them to a form significantly more edible and digestible by ruminant animals utilizing a solution of chlorites (OCl) with sodium hydroxide at an elevated pH.

Another object of this invention is to provide a new and improved method for the solution treatment of crop residues and feed grains to convert them to a form significantly more edible and digestible by ruminant animals utilizing a solution of chlorites (OCl) at a pH of 7.0–10.0.

Another object of this invention is to provide a new and improved method for the solution treatment of crop residues and feed grains to convert them to a form significantly more edible and digestible by ruminant animals utilizing a solution of chlorites (OCl) with sodium hydroxide at a pH of 7.0–10.0.

Another object of this invention is to provide a new and improved method for the solution treatment of sorghum grains to convert them to a form significantly more edible and digestible by ruminant animals utilizing a solution of chlorite (OCl) with a phosphate buffer solution.

Another object of this invention is to provide a new and improved method for the solution treatment of sorghum grains to convert them to a form significantly more edible and digestible by ruminant animals utilizing a solution of chlorite (OCl) with sodium hydroxide with a phosphate buffer solution.

Another object of this invention is to provide a new and improved method for the solution treatment of sorghum grains to convert them to a form significantly more edible and digestible by ruminant animals utilizing a solution of chlorite (OCl) with sodium hydroxide with a phosphate buffer solution at a pH of 6.5–7.0.

Other objects will be apparent from time to time throughout the specification and claims a hereinafter related.

These objects and other objects of the invention are accomplished by a novel method for treatment of crop residues and feed grains, such as corn and sorghum, etc., to improve the digestibility for feeding livestock in which such grains ar treated with a solution of chlorite (OCl) with sodium hydroxide and for sorghum grains with a phosphate buffer solution at a pH of about 7.0–10.0, except the buffer solution which has a pH of about 6.5 to 7.0. The treated grains are satisfactory feed for ruminant animals, improved by about 50% in digestibility and are non-toxic.

DRAWINGS

For a further understanding of the nature and object of the present invention, reference should be made to the following drawing in which like parts are given like reference numerals and wherein:

FIG. 1 is a schematic of a chlorite production process.

DESCRIPTION OF PREFERRED EMBODIMENTS OF THIS PROCESS

Comparison to Other Patents

Figure 1:
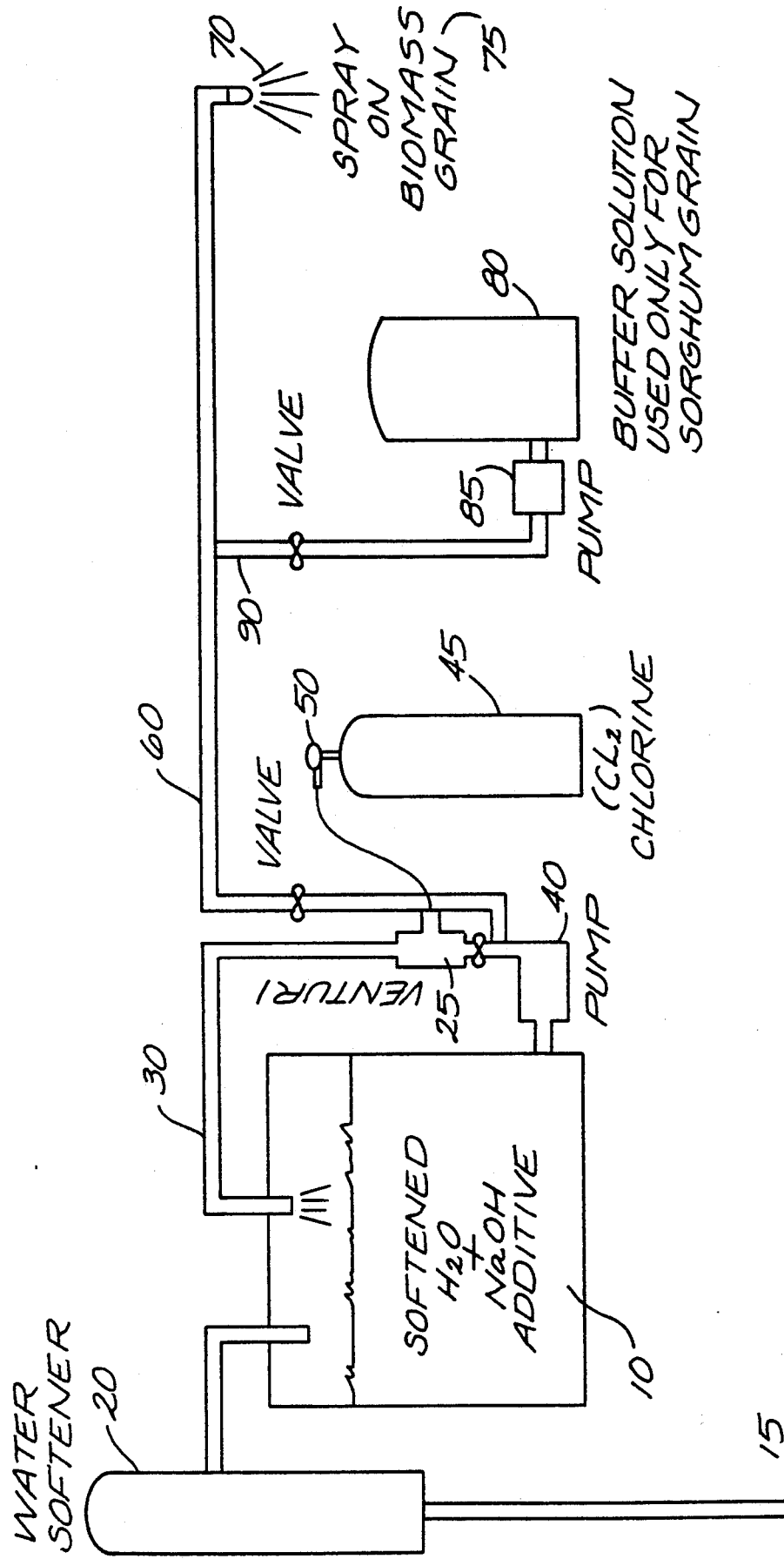

In methods (the method of Charles T. Sweeney, U.S. Pat. Nos. 5,032,239 and 5,118,397) for conversion of comminuted lignocellulosic agricultural wastes into a form edible by ruminant animals, the wastes, e.g., straw, corn stalks and husks, cotton wastes, peanut shells, saw dust, etc., are sprayed with an aqueous solution of a mixed oxidant gas containing chlorine and various oxygen-containing species, at a pH of about 11–12, to produce a total water content of less than 20%, a pH of about 11.4–11.7, and NaOH content of less than 5% in the waste.

The ligno-cellulosic wastes, e.g., straw, corn stalks and husks, cotton wastes, peanut shells, saw dust, etc., are comminuted to a relatively small size and introduced into storage zone. A mixed oxidant generator, as in the above-identified Sweeney patents, produces an oxidant gas mixture which is introduced into an absorber where it is dissolved in water with appropriate adjustment of pH to an alkaline condition to produce a mixed oxidant solution of 0.01–7.0% at a pH of 7.5–12.0 consisting of a mixture of salts of the formula $NaClO_x$, where x is 1–7. The mixed-oxidant gas is a mixture of chlorine, oxides of chlorine, and various oxygen species, such as oxygen, hydrogen peroxide, ozone, etc. When a low salt concentration solution is electrolyzed in the cell, the output is a mixed oxidant gas containing chlorine and various oxygen-containing species.

The solution from the absorber is mixed with concentrated aqueous NaOH, and the mixture may be diluted with water to the desired alkalinity and is sprayed on the comminuted cellulosic wastes to produce a total water content of less than 20%, and pH of 11.4–11.7, NaOH content less than 5%, on the wastes. After a short storage time, the cellulosic wastes are converted to a more digestible form.

Treatment of Cellulosic Wastes

A number of experiments were carried out for treating various cellulosic wastes with mixed oxide solutions produced as described above. The treated waste was first tested for improved digestibility and then used to demonstrate an actual use in feeding animals. The tests were run principally on cotton gin trash (CGT) to make it digestible and on other feedstocks to improve digestibility.

Example 1—Mixed Oxidant Solution Treatment Cotton Gin Trash

A mixed oxidant gas generator was operated to produce a mixed-oxidant gas comprising a mixture of chlorine, chlorine oxides, and various oxygen species, such as oxygen, hydrogen peroxide, ozone, etc., which was absorbed into aqueous alkali at pH 12.0 to produce a solution containing 0.070% mixed oxidants (700 ppm.) in the form of $NaClO_x$ salts, where $x=1-7$. 200 ml. mixed oxidant solution were mixed with 120 ml. of 50% aqueous NaOH. Sufficient solution was sprayed on dry chopped gin trash (cotton bolls, stems, etc.) to produce a pH of 11.9 (which is lowered rapidly as lignin is released) and a water content of 35% in the gin trash and mixed for one minute.

After allowing the chopped gin trash to set a short time to react, the product was contacted with the stomach digestive juices of the ruminant, and the amount digested determined by weight loss. The product obtained has a digestibility of about 54%. The digestibility of an untreated control is about 36%. The high alkalinity of the treating solution, however, is a disadvantage in that it contributes to excessive corrosion in the processing equipment.

Example 2—Mixed Oxidant Solution Treatment Whole Grain Treatment

A number of experiments were carried out to evaluate the possible improvement in digestibility of whole grains by treatment with the mixed oxides (MO) solutions to convert the indigestible cellulosic portions of the grains.

A mixed oxidant gas generator, as in Sweeney U.S. Pat. No. 5,032,239, was operated to produce a mixed-oxidant gas comprising a mixed oxidant gas, as in Example 1, which was absorbed into aqueous alkali at pH 11.5 to produce a solution of pH 7.7 having a mixed oxidant normality of 0.0365.

Whole kernel corn and whole kernel grain sorghum were run through a commercial mechanical scarifier to make small cuts in the surface of the grains and treated with water until 7% water was absorbed as controls. Whole kernel corn and whole kernel grain sorghum were treated with the above described solution to an uptake of 7% by weight.

Corn, with 7% MO solution absorption, had an increase in digestibility of 38% over untreated controls after 12 hours treatment. Grain sorghum, with 7% MO solution absorption, had an improvement in digestibility of 56% over untreated controls after 16 hours treatment.

The improvement in whole grains is attributable to the conversion of the cellulosic shell (bran) of the grain which is relatively indigestible.

Experimental Search for Mechanism of Oxidants Used Conversion of Cellulosic Wastes Previous data, presented in patent application Ser. No. 808,223, filed Dec. 16, 1991, has suggested that two distinct components exist in the mixed oxidant solution. However, it was found that after adding KI crystals and titrating with sodium thiosulfate (during an analytical procedure) the first component of the mixed oxidant ended up to be a pH of 10 to 11. This was an indication that a peroxide was the first component. Upon monitoring pH of the second component (after having acidified solution), a reaction response with the KI was at the approximate pH of HOCl acid.

An attempt was then made to determine whether the solution contained any extremely reactive chlorite or perchlorate, etc., so 500 ml of the solution was allowed to totally evaporate leaving a crystal sediment which was analyzed. Test results show the major component is HOCl or OCl. The ability to distinguish between the two is not easy but concurred with the hypotheses being examined.

One expert has indicated a formula whereby small amounts of peroxide could be existent in the presence of chlorites above a pH of 8.5. However, the HOCl component begins to show up in the electrolytic process based on the pH of the solution. The solution, after being prepared, diminishes over time from pH of 8.3 down to pH 7.4 to 7.5 and then stabilizes. That is the stable point of HOCl in solution and substantially no peroxide could then be present.

Several oxidant products may be formed in the electrolysis of aqueous solutions containing NaCl and NaOH. Relevant reactions and thermodynamic data are summarized below.

Oxidation of Hydroxide Ion to Hydrogen Peroxide or Oxygen

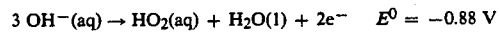
$$3\ OH^-(aq) \rightarrow HO_2^-(aq) + H_2O(l) + 2e^- \quad E^0 = -0.88\ V$$

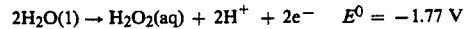
$$2H_2O(l) \rightarrow H_2O_2(aq) + 2H^+ + 2e^- \quad E^0 = -1.77\ V$$

The oxidation of hydroxide ion (OH) to hydroperoxide ($HO_2^-$) in basic solution occurs at a much smaller potential than is required for the oxidation of water to hydrogen peroxide in neutral or acidic solution.

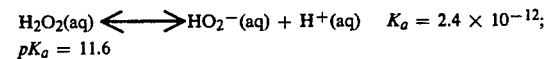
$$H_2O_2(aq) \rightleftharpoons HO_2^-(aq) + H^+(aq) \quad K_a = 2.4 \times 10^{-12};\ pK_a = 11.6$$

Hydrogen peroxide is a weak acid which ionizes to give the hydroperoxide ion in strongly basic solutions. The $pK_a$ of 11.6 means that the major form of peroxide in solutions with pH less than 11 is $H_2O_2$. Above pH 12, most of the peroxide is found in the $HO_2^-$ ionic form.

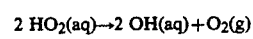
$$2\ HO_2^-(aq) \rightarrow 2\ OH^-(aq) + O_2(g)$$

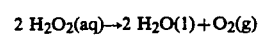
$$2\ H_2O_2(aq) \rightarrow 2\ H_2O(l) + O_2(g)$$

Both $HO_2^-$ and $H_2O_2$ are unstable in aqueous solution, eventually decomposing with evolution of oxygen gas. Fortunately, these reactions are fairly slow in the absence of a catalyst: so aqueous peroxide solutions are reasonably stable at room temperature. Decomposition of peroxide to oxygen in boiling water is quite fast, however.

$$4OH^-(aq) \rightarrow O_2(g) + 2H_2O(q) + 4e^- \quad E^0 = -0.40\ V$$

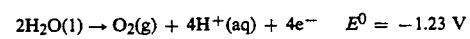
$$2H_2O(l) \rightarrow O_2(g) + 4H^+(aq) + 4e^- \quad E^0 = -1.23\ V$$

Electrolysis of water not only converts $OH^-$ or $H_2O$ to peroxide, but complete oxidation to oxygen also occurs. The oxidation potentials show that it is actually easier to convert water to oxygen than to peroxide. For this reason, $O_2$ inevitably is a byproduct of the electrolysis of water, even if peroxide is the desired product. Some ozone may also be generated at the anode, but both $O_2$ and $O_3$ will be carried away in the gas stream.

Oxidation of Chloride Ion to Chlorine and Hypochlorite $$2Cl^-(aq) \rightarrow Cl_2(g) \quad E^0 = -1.36 \text{ V}$$

A higher potential is required to oxidize chloride ion to chlorine than is needed to convert hydroxide ion to hydroperoxide in basic solutions. In neutral or acidic solutions, however, the reverse is true. The oxidation of Cl to $Cl_2$ stays at the same potential for all pH's, but the water-peroxide oxidation shifts to higher potential with the decreasing pH. For this reason, the yield of peroxide from the electrolysis of water at pH's less than 10 will be very small.

$$Cl_2(g) + H_2O(l) \leftrightarrow HClO(aq) + HCl(aq)$$

$$Cl_2(g) + 2 OH^-(aq) \rightarrow ClO^-(aq) + Cl^-(aq) + H_2O(l)$$

Chlorine reacts with water in both acidic and basic solutions. In acidic solution, small amounts of hypochlorous acid (HClO) and hydrochloric acid (HCl) are in equilibrium with unreacted chlorine. Virtually all of the chlorine is consumed in basic solutions, however, generating a mixture of hypochlorite and chloride ions. For this reason, chlorine gas bubbles out of solution when a hypochlorite/chloride mixture is acidified.

$$ClO^-(aq) + H_2O(l) + 2e^- \rightarrow Cl^-(aq) + 2OH^-(aq) \quad E^0 = +0.89 \text{ V}$$

$$HClO(aq) + H^+(aq) + 2e^- \rightarrow Cl^-(aq) + H_2O(l) \quad E^0 = +1.49 \text{ V}$$

$$HClO(aq) \leftrightarrow H^+(aq) + ClO^-(aq) \quad K_a = 3.2 \times 10^{-8}; \quad pK_a = 7.5$$

$$HO_2^-(aq) + H_2O(l) + 2e^- \rightarrow 3OH^-(aq) \quad E^0 = +0.88 \text{ V}$$

Hypochlorite ion is a relatively strong oxidant in basic solution, ranking nearly equal to the hydroperoxide ion in oxidizing strength. Hypochlorous acid, a much stronger oxidant than hypochlorite ion, is converted to ClO with a $pK_a$ of 7.5. This means that HClO will be the dominant form of hypochlorite below pH 7 while ClO is favored at pH larger than 8.

$$3 ClO^- \rightarrow ClO_3^-(aq) + 2 Cl^-(aq)$$

The hypochlorite ion reacts with itself to give chlorate ($ClO_3^-$) and chloride products. This reaction is unavoidable—there will always be some chlorate in hypochlorite solutions. This side reaction occurs most quickly in neutral solutions. Although $ClO_3$ is a stronger oxidant than $ClO^-$, chlorate generally reacts very slowly with reducing agents in neutral or basic solution, making it effectively useless as an oxidizing agent.

Predigestion

It is believed that the treatment of biomass materials in order to increase digestibility is not clearly understood by modern day researchers as illustrated in the prior art portion of the "Brief Description of the Art." Many believe such treatment requires a high pH solution and acid additives in order to "break" the tight lignin bond within a specific material.

The word "delignification" in itself may not be correct as previously proposed. The term "predigestion" may be preferable, to indicate a breaking of certain chemical or molecular bonds and creating a "swiss cheese" effect on the material which would allow digestive juices to flow easily and material digestibility to increase. A softening of the material would occur due to breaking of certain of such molecular bonds.

The hypothesis to date has been that sodium hydroxide swells the biomass materials, which would be under treatment by chemical methods, and the acid attacks perhaps the hydroxyl (OH) component of the biomass in some yet unknown manner.

As discussed above, Sweeney utilized an electrolytic cell and very inexpensive gas moisture product to open a new door of entry into the "chemically treated" biomass field of research.

Originally, as discussed above, the gaseous output of the electrolytic cell was aspirated or removed from the anode (+) chamber of the cell and mixed into a circulating water solution of 4% sodium hydroxide. A standard pump and venturi was used for this function. The material, gin trash waste, was treated at a specific concentration of solution and digestibility increased above 50% when compared to non-treated gin trash waste. Grains of corn and sorghum responded to the treatment also. There appears to be no prior art for this type of chemical treatment of grains to increase digestibility.

By testing, hydrogen peroxide individually, hydrogen peroxide was determined to assist grains and led to above-referenced patent application for which this application is a continuation-in-part application.

The digestibility method of evaluation used was in-vitro technique which is the method of simulating the stomach of a ruminant animal in a test tube method, an effective, accurate and highly recognized method. The in-vitro analysis closely represents the ruminant in content and pH. The principle being one of measuring the weight of material into the test tube and then after the required time period has elapsed, the remaining weight would be the difference—digestibility—of the material sample.

A solution was made by using bottled chlorine gas. The result on roughage and grains seem to indicate:

IN-VITRO TESTING (TEXAS TECH)

|  | Cotton Gin Trash | Corn | Sorghum |
| --- | --- | --- | --- |
| Bottled chlorine pH 9.0-10.0 | 54.2% increases | 20% | 5-7% |

Even though the lower performance of sorghum grain is not completely understood, the hypothesis is that the key ingredient to be used is chlorine or chlorite (OCl) components.

Above a pH of 9, chlorite is extremely stable and would exist in solution as sodium chlorite ($NaClO_x$). In the biomass and corn application a hydrogen (H) is taken from the material and breaks the sodium chlorite into hypochlorous acid (HOCL) and sodium hydroxide (NaOH) or sodium chloride (NaCl). Both sodium components would be of minor benefit, and sodium hydroxide (NaOH) component plus hypochlorous acid would be similar in reference to previous biomass research utilizing sodium hydroxide (NaOH) and hydrogen peroxide ($H_2O_2$) research studies. It is believed that the bond which broke contributed a hydrogen compound to the sodium chlorite component and began a series of molecular bond breaking and opening up the biomass substrate. This same principle did not seem to be as effective for sorghum; therefore, a test was run utilizing a buffer to inject into the chlorite solution pH 9.0 just before applying the solution to the sorghum grain. This buffer would lower the pH to pH 7.0 which would change the equilibrium favoring hypochlorous acid (HOCl) over sodium chlorite. This acid appears to perform fairly well on sorghum.

IN-VITRO TESTING INCREASE

|  | Buffer Added | Corn | Sorghum Grain |
| --- | --- | --- | --- |
| Bottled Chlorine pH 9.0 | pH 7.0 | no increase | 16–18% increase |

The change in pH was advantageous to sorghum and negative to corn.

Chlorine reacts with water as follows:

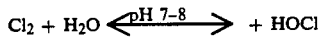

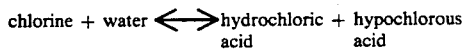

For the three types of materials treated:

| a. Biomass (Gin Trash) and Corn | A high pH is needed to assist in stabilizing chlorite for storage and shipment and to prevent decomposition. |
| --- | --- |
| b> Sorghum Grain | A lower pH level and more reactive form of hypochlorous (HOCl) is needed but storage and shipping need to be considered. |

When chlorine is mixed into a high pH solution of sodium hydroxide (NaOH) the following occurs:

$Cl_2(g) + 2 NaOH(aq) \rightarrow NaOCl(aq) + NaCl(aq) + H_2O(l)$

The efficiency of chlorine absorption into acidic aqueous solution is much lower.

$Cl_2(g) + H_2O(l) \rightarrow HOCl(aq) + HCl(aq)$

In fact, when the pH of hypochlorite solutions is allowed to drop below 7 for an appreciable period of time, oxidizing power is lost in the form of escaping chlorine gas. Loss of chlorine occurs in several steps, as follows. First, hypochlorite ion is converted to hypochlorous acid below pH 7.5.

$OCl(aq) + H(aq) \rightarrow HOCl(aq)$

Second, hypochlorous acid combines with hydrochloric acid in the solution to form chlorine gas.

$HOCl(aq) + HCl(aq) \rightarrow Cl_2(g) + H_2O(l)$.

If treatment of gin trash or grains with OCl is desired, the pH should be adjusted to pH 8.5–9.0. Treatment with HOCl requires a lower pH, in the range 6.5–7.0. If the pH is lowered from 9 to 7 with a buffer immediately before biomass treatment, then loss of chlorine may be avoided, for the most part.

As shown in FIG. 1, a circulating body of "softened" water 10 from input water 15 through a water softener 20 is set up with a venturi or suction apparatus 25 in the line 30. The softened water prevents contaminants of the water from interfering with the process. A pump 40 is used for circulation. The pump 40 should be a chemical quality pump with good chemical resistance to the solution properties of pH factors above 8.0.

Attached to the venturi 25 input is a bottle 45 of chlorine ($Cl_2$) or a chlorine dioxide ($ClO_2$) production system (not shown) with all necessary regulator valves 50 and safety apparatus. The outlet 60 of the pump 40 may then be used as a spray 70 on biomass grain 75.

Example 3 of an 800 gallon mix

Normal shipping strength of the final product is 0.14 normality to 0.15 normality. 55 gallon drums of the final product are diluted on site with water for the proper dosage.

The circulating pump 40 is turned on and the solution 10 circulated to get the venturi 25 functioning and to allow the additives to be mixed well.

Twenty-two and one-tenth liters (22.1) of 50% sodium hydroxide (NaOH) is added to the circulating solution 10 and allowed to mix well. The pH of the solution will be above pH 13.0.

The chlorine gas source 45 is slowly turned on and allowed to mix with a low pressure input of 10 PSI. As the chlorine gas input 45 mixes with the sodium hydroxide and water solution 10, the pH will continue to decrease until a preferred pH 9.0 to pH 9.5 is reached.

The approximate pH 9.0 is critical as this is the point where chlorite OCl is very stable and stability is a key in order to ship the final product in drums to the final user application. To arrive at 0.14 normality for the above solution, a total of thirty-three and four tenths (33.4) lbs. of chlorine gaseous component would have to be utilized. Standard titration methods of evaluating the normality of the solution are readily available. A stable chlorite (OCl) solution is now ready to be utilized in biomass roughages and grains as follows:

Example 3.1—Roughages

Approximately ten percent (10%) added moisture (by weight) of diluted solution is added to roughage product to enhance overall digestibility.

A ton of gin waste (2,000 lbs.) would require two hundred pounds (200 lbs. of added moisture, by weight, diluted) of diluted solution.

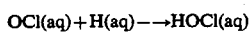

The normality of the twenty-four added gallons should be between 0.02 and 0.03 as the solution is applied.

The total pounds of oxidizing strength needed in twenty-four gallons of added moisture with a normality between 0.02 and 0.03 would be 0.14 lbs.

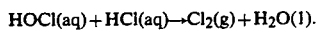

If the concentration of the drum solution was a normality of 0.14, then the following calculation shows two (2) gallons are needed:

$$\frac{2 \text{ gallon} \times 5000 \text{ (.14N)} \times 8.3}{1,000,000} = .083 \text{ lbs/gal}$$

Approximately two gallons of concentrate plus twenty-two (22) gallons of on-site water is used. The final product should be mixed well with the roughages. The process and strength of the solution could vary with different roughages as further experimental applications are applied and evaluated. This yields the results set out above in the in-vitro testing.

It is believed that the function of the added solution is that the sodium chlorite (NaOCl) allows the OCl to react with the biomass substrate and gain a hydrogen (H) to convert to hypochlorous acid (HOCl) and the sodium (Na) combines with a hydroxide (OH) leaving sodium hydroxide (NaOH) and hypochlorous acid (HOCl) to react with the substrate material. The original hydrogen (H) gained by the chlorite (OCl) could be a chain reaction in the degradation of the organic chain of molecules.

The ultimate limiting factor to total progress in maximizing digestibility is the availability of chlorine (OCl) to the substrate.

Example 3.2—Corn

Corn grain seems to react almost identical with the roughage hypothesis. Seven percent (7%) of added moisture to corn has been used in all applications.

A ton of corn (2,000 lbs.) would require one hundred forty (140) pounds of added moisture of diluted solution $$\frac{140 \text{ lbs.}}{8.3 \text{ lbs/wt. of water}} = 16.8 \text{ gallons}$$

The normality of the sixteen and eight tenths gallons should be approximately 0.02 normality as the solution is applied.

$$\frac{16.8 \text{ gallons} \times 710 \text{ (.02N)} \times 83}{1,000,000} = 1 \text{ lb. needed}$$

One gallon of 0.14 normality solution would yield 0.083 lbs. of oxidizing power. Therefore:

$$\frac{.10 \text{ lbs. of oxidizer needed}}{.083 \text{ lbs. per gallon of solution}} = \frac{1.2 \text{ gallons needed}}{\text{of solution}}$$

One and two-tenths gallons of solution mixed with fifteen and six-tenths gallons of on-site water. This yields the results set out above in the in-vitro testing.

Sorghum

Sorghum grain seems to respond only to the chlorite (OCl) additive when it has been converted to hypochlorous acid (HOCl). This is accomplished by lowering the pH of the solution to approximate level of pH 7.0 just prior to applying the solution to the grain.

When the pH 9.0 sodium chlorite solution is lower to pH 7.0, the chlorite OCl converts to hypochlorous acid (HOCl) with the sodium believed to go to sodium hydroxide. This step seems to better explain previous research with sodium hydroxide and an acid hydrogen peroxide.

Example 3.3—Sorghum

The percent moisture added to sorghum is the same as set out above for corn and all principles are identical with one exception.

Just prior to spraying the sorghum grain 75, a buffer solution 80 is injected by pump 85 through line 90 to mix with the fluid from line 60. This mixing which lowers the solution pH to pH 6.8-7.0 when required normality strengths are utilized. Such buffer can easily be applied by chemical pressure pump 95 set to the prescribed ratio of input to gallon flowed of solution. A preferred buffer is a phosphate buffer. Diluted hydrochloric acid may also be used as a buffer source, as another example. However, a wide variety of buffers would serve the purpose. This yields the combination result set above out in the in-vitro testing and in-vitro testing increase.

The buffer is prepared by mixing 58.3 grams of sodium dihydrogen phosphate monohydrate ($NaH_2PO_4 \cdot H_2O$) with 69.6 grams of sodium hydrogen phosphate ($Na_2HPO_4$) in one gallon of water. When one volume of this buffer (i.e. 1 gallon) is mixed with 9 volumes of chlorite solution (i.e. 9 gallons), the pH of the resulting mixture will fall somewhere in the range of 6.8 to 7.2, depending on the strength of the oxidant solution. This buffered mixture must then be used immediately to avoid the loss of chlorine gas and oxidizing power.

Any method to come up with a stable chlorite (OCl) in a pH 9.0 or better would work in this principle. Chlorine gas ($Cl_2$) and chlorine dioxide ($ClO_2$) are just two examples of such products.

The key to the manufacture and success of this solution is the purest state of a chlorite to be utilized that is possible to be manufactured. Common bleach is highly contaminated with at least chlorates, hypochlorous.

Preferably, the feed material in all cases is treated with the solution until the feed material has absorbed 5% to 15% of its weight of solution.

From this Example and the other Examples reported above, it has been concluded that the process is not limited to the treatment of feed grains.

While this invention has been described fully and completely, with special emphasis on several preferred embodiments, it should be understood that, within the scope of the applied claims, the invention may be practiced otherwise than as specifically described.

I claim:

1. A method for treating feed materials from the class of feed grains and cellulosic wastes to increase their digestibility by ruminants, which comprises preparing an aqueous solution of chlorites, having a chlorite normality of about 0.02–0.03 and pH above about 8.5 and treating the feed materials with 5–15% by weight of said feed materials of said solution for a time sufficient to convert the feed materials to a more highly digestible state.

2. A method according to claim 1 in which the feed materials is corn.

3. A feed material for livestock produces according to claim 2.

4. A method according to claim 1 in which the feed material is cellulosic waste.

5. A feed material for livestock produced according to claim 4.

6. A method according to claim 1 in which the feed material is treated with said solution at ambient temperature to convert the feed material to a more highly digestible state.

7. A method of claim 1 wherein said aqueous solution uses softened water.

8. A method according to claim 1 wherein said solution is buffered by addition of a phosphate.

9. A modified sorghum grain having improved digestibility for livestock produced according to claim 7.

10. A method according to claim 1 in which said solution is derived form introducing chlorine gas into a mixture of softened water and sodium hydroxide.

11. A feed material for livestock produced according to claim 1.

12. A method for treating sorghum grain to increase its digestibility by ruminants, which comprises preparing an aqueous solution of chlorites, having a chlorite normality of about 0.02–0.03 and pH above about 8.5, buffering said solution to near neutral just prior to treatment and then treating said sorghum grain with 5–15% by weight of said sorghum grain said solution for a time sufficient to convert said sorghum grain to a more highly digestible state.

13. A method according to claim 12 in which said solution is buffered to a pH between 6.5 and 7.2 just prior to said treatment.

14. A modified sorghum grain having improved digestibility for livestock produced according to claim 12.

15. A modified sorghum grain having improved digestibility for livestock produced according to claim 11.

* * * * *